US008051941B2

(12) United States Patent
Takayasu et al.

(10) Patent No.: US 8,051,941 B2
(45) Date of Patent: Nov. 8, 2011

(54) PASSENGER'S WEIGHT MEASUREMENT DEVICE FOR VEHICLE SEAT

(75) Inventors: Wataru Takayasu, Reynoldsburg, OH (US); Shinya Ishima, Shioya-gun (JP); Shigeru Endo, Shioya-gun (JP); Kenji Sato, Sakura (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

(21) Appl. No.: 11/992,418

(22) PCT Filed: Sep. 29, 2006

(86) PCT No.: PCT/JP2006/319479
§ 371 (c)(1),
(2), (4) Date: Mar. 21, 2008

(87) PCT Pub. No.: WO2007/037375
PCT Pub. Date: Apr. 5, 2007

(65) Prior Publication Data
US 2009/0139774 A1 Jun. 4, 2009

(30) Foreign Application Priority Data

Sep. 30, 2005 (JP) ................................. 2005-286881

(51) Int. Cl.
*B60R 21/015* (2006.01)
*G01G 19/52* (2006.01)
*G01G 19/12* (2006.01)
*B60N 2/44* (2006.01)

(52) U.S. Cl. ... 180/273; 280/735; 177/136; 177/DIG. 9; 73/856

(58) Field of Classification Search .................... 73/856; 177/144, DIG. 9; 180/273; 280/735
See application file for complete search history.

(56) References Cited

U.S. PATENT DOCUMENTS
1,679,620 A 8/1928 Moore
(Continued)

FOREIGN PATENT DOCUMENTS
DE 103 15 400 A1 10/2004
(Continued)

OTHER PUBLICATIONS
Office Action for U.S. Appl. No. 12/588,922, mailed Sep. 29, 2010.
(Continued)

*Primary Examiner* — Randy W Gibson
(74) *Attorney, Agent, or Firm* — Oliff & Berridge, PLC

(57) ABSTRACT

An upper rail is movable in a rear and front direction with respect to a lower rail fixed to a vehicle floor. A load sensor is fixed to an upper surface of the upper rail 4, and a rectangular frame 30 is attached onto the load sensor. A rod of the load sensor sequentially penetrates a web of the rectangular frame, a plain washer and a spring holder upward, and a coil spring is wound around the rod. A bush is fitted to an edge of a hole of the plain washer, and a step difference is formed between an upper surface of the plain washer and the bush. A nut is screwed to the rod, and the nut tightens a bottom of a cup portion of the spring holder. In such a way, the coil spring is sandwiched between the spring holder and the web and is compressed, and an end portion of the coil spring engages with the step difference.

27 Claims, 7 Drawing Sheets

U.S. PATENT DOCUMENTS

| | | | |
|---|---|---|---|
| 4,178,037 A | 12/1979 | Pickles | |
| 4,182,255 A | 1/1980 | Reid | |
| 4,281,443 A | 8/1981 | Threlfall | |
| 4,353,565 A | 10/1982 | Smith et al. | |
| 4,597,552 A | 7/1986 | Nishino | |
| 5,110,177 A | 5/1992 | Akio | |
| 5,286,076 A | 2/1994 | DeVoss et al. | |
| 5,308,148 A | 5/1994 | Peterson et al. | |
| 5,421,124 A | 6/1995 | Zuccaro | |
| 5,478,975 A * | 12/1995 | Ford | 177/210 FP |
| 5,492,388 A | 2/1996 | Kawasaki | |
| 5,600,104 A * | 2/1997 | McCauley et al. | 177/136 |
| 5,714,695 A | 2/1998 | Bruns | |
| 5,921,624 A | 7/1999 | Wu | |
| 5,991,676 A * | 11/1999 | Podoloff et al. | 701/45 |
| 6,039,344 A | 3/2000 | Mehney et al. | |
| 6,089,478 A | 7/2000 | Truan et al. | |
| 6,145,909 A | 11/2000 | Staley et al. | |
| 6,150,619 A * | 11/2000 | Borngasser | 177/201 |
| 6,231,076 B1 | 5/2001 | Blakesley et al. | |
| 6,242,701 B1 | 6/2001 | Breed et al. | |
| 6,356,200 B1 | 3/2002 | Hamada et al. | |
| 6,367,859 B1 | 4/2002 | Flory et al. | |
| 6,405,987 B1 | 6/2002 | Andrigo et al. | |
| 6,555,765 B2 * | 4/2003 | Paine | 177/142 |
| 6,559,392 B1 | 5/2003 | Haynes et al. | |
| 6,637,824 B1 | 10/2003 | Yokota | |
| 6,644,903 B1 | 11/2003 | Arand | |
| 6,661,341 B2 | 12/2003 | Masuda et al. | |
| 6,677,539 B2 * | 1/2004 | Miura et al. | 177/136 |
| 6,695,379 B1 | 2/2004 | Ishida | |
| 6,702,376 B1 | 3/2004 | Shen | |
| 6,772,985 B2 | 8/2004 | Lee | |
| 6,786,691 B2 | 9/2004 | Alden | |
| 6,814,370 B2 | 11/2004 | Yasui | |
| 6,849,808 B2 | 2/2005 | Enomoto et al. | |
| 6,916,997 B2 | 7/2005 | Thakur et al. | |
| 6,929,324 B2 | 8/2005 | Enomoto et al. | |
| 6,969,809 B2 | 11/2005 | Rainey | |
| 6,981,717 B2 | 1/2006 | Sakamoto et al. | |
| 6,994,397 B2 | 2/2006 | Young et al. | |
| 7,038,146 B2 * | 5/2006 | Saito et al. | 177/136 |
| 7,091,426 B2 | 8/2006 | Nagai et al. | |
| 7,131,513 B2 | 11/2006 | Mutou et al. | |
| 7,137,665 B2 | 11/2006 | Osawa et al. | |
| 7,185,867 B2 | 3/2007 | Hill et al. | |
| 7,189,931 B2 * | 3/2007 | Hida et al. | 177/144 |
| 7,195,261 B2 | 3/2007 | Yoshida et al. | |
| 7,210,358 B2 * | 5/2007 | Yamazaki | 73/761 |
| 7,281,766 B2 | 10/2007 | Fujita et al. | |
| 7,328,627 B2 | 2/2008 | Kawabata et al. | |
| 7,373,846 B2 * | 5/2008 | Furukawa et al. | 73/862.621 |
| 7,422,291 B2 | 9/2008 | Nagayama | |
| 7,435,918 B2 | 10/2008 | Becker et al. | |
| 7,438,350 B1 | 10/2008 | Peterson et al. | |
| 7,455,343 B2 * | 11/2008 | Endo et al. | 296/68.1 |
| 7,488,026 B1 | 2/2009 | Jovicevic | |
| 7,510,161 B2 | 3/2009 | Fischer et al. | |
| 7,520,175 B2 * | 4/2009 | Matsukawa et al. | 73/774 |
| 7,604,213 B2 | 10/2009 | Choi et al. | |
| 7,614,680 B2 | 11/2009 | Endo et al. | |
| 7,729,122 B2 | 6/2010 | Wong | |
| 7,731,281 B2 | 6/2010 | Kurita et al. | |
| 7,762,150 B2 | 7/2010 | Kawabata et al. | |
| 7,793,557 B2 | 9/2010 | Endo et al. | |
| 7,823,951 B2 | 11/2010 | Endo et al. | |
| 7,836,997 B2 * | 11/2010 | Takayasu et al. | 180/273 |
| 7,870,927 B2 | 1/2011 | Endo et al. | |
| 7,878,570 B2 | 2/2011 | Endo et al. | |
| 2003/0168895 A1 | 9/2003 | Sakai et al. | |
| 2004/0032117 A1 | 2/2004 | Pinto et al. | |
| 2004/0100388 A1 | 5/2004 | Yoshida et al. | |
| 2004/0160113 A1 | 8/2004 | Rehfuss et al. | |
| 2005/0061643 A1 | 3/2005 | Rainey | |
| 2005/0099041 A1 | 5/2005 | Becker et al. | |
| 2005/0109909 A1 | 5/2005 | Osawa et al. | |
| 2005/0284668 A1 | 12/2005 | Hida et al. | |
| 2005/0284669 A1 | 12/2005 | DiPaola et al. | |
| 2006/0010984 A1 | 1/2006 | Yamazaki | |
| 2006/0048582 A1 * | 3/2006 | Furukawa et al. | 73/856 |
| 2007/0012487 A1 | 1/2007 | Becker et al. | |
| 2007/0045986 A1 | 3/2007 | Lirot | |
| 2007/0057527 A1 | 3/2007 | Endo et al. | |
| 2008/0036251 A1 | 2/2008 | Endo et al. | |
| 2008/0079296 A1 | 4/2008 | Endo et al. | |
| 2008/0084086 A1 | 4/2008 | Endo et al. | |
| 2009/0079239 A1 | 3/2009 | Endo et al. | |
| 2009/0139775 A1 * | 6/2009 | Takayasu et al. | 177/136 |
| 2009/0294185 A1 | 12/2009 | Bruzzone et al. | |
| 2009/0301793 A1 | 12/2009 | Endo et al. | |
| 2009/0301794 A1 | 12/2009 | Endo et al. | |
| 2010/0282522 A1 | 11/2010 | Endo et al. | |
| 2011/0000719 A1 | 1/2011 | Takayasu et al. | |
| 2011/0006580 A1 | 1/2011 | Ishimoto et al. | |
| 2011/0018301 A1 | 1/2011 | Endo et al. | |
| 2011/0018302 A1 | 1/2011 | Endo et al. | |

FOREIGN PATENT DOCUMENTS

| | | |
|---|---|---|
| GB | 2 415 787 A | 1/2006 |
| JP | U-63-026466 | 2/1988 |
| JP | U-05-043031 | 6/1993 |
| JP | A 8-164039 | 6/1996 |
| JP | A 9-207638 | 8/1997 |
| JP | 10-297334 A | 11/1998 |
| JP | A-11-108746 | 4/1999 |
| JP | 11-304579 A | 11/1999 |
| JP | 2000-280813 A | 10/2000 |
| JP | A 2001-50329 | 2/2001 |
| JP | 2001-158269 A | 6/2001 |
| JP | A 2003-11709 | 1/2003 |
| JP | A-2003-166872 | 6/2003 |
| JP | 2003-237535 A | 8/2003 |
| JP | 2003-287458 A | 10/2003 |
| JP | 2004-210167 A | 7/2004 |
| JP | A 2004-306849 | 11/2004 |
| JP | 2001-030819 A | 2/2008 |
| JP | 2008-296657 A | 12/2008 |

OTHER PUBLICATIONS

"Radius" from eFunda Design Standards website, Copyright 2010 by eFunda, Inc. (http://www.efunda.com/designstandards/plastic_design/radius.cfm).
"What is eFunda" from eFunda Design Standards website, Copyright 2010 by eFunda, Inc. (http://www.efunda.com/about/about.cfm).
Office Action for U.S. Appl. No. 12/536,124, mailed Jul. 1, 2010.
Office Action for U.S. Appl. No. 12/536,151, mailed Aug. 10, 2010.
Office Action for U.S. Appl. No. 12/536,075, mailed Apr. 7, 2010.
Office Action for U.S. Appl. No. 12/536,075, mailed Oct. 15, 2010.
English-language translation of Japanese Office Action in Application No. 2004-223456, mailed Aug. 3, 2010.
European Search Report for European Application No. 10007613.2 dated Oct. 9, 2010.
Notice of Allowance for U.S. Appl. No. 12/536,075, mailed Nov. 8, 2010.
U.S. Appl. No. 12/961,758, filed Dec. 7, 2010.
U.S. Appl. No. 12/588,922, filed Nov. 2, 2009.
U.S. Appl. No. 12/536,075, filed Aug. 5, 2009.
U.S. Appl. No. 12/536,124, filed Aug. 5, 2009.
U.S. Appl. No. 12/536,151, filed Aug. 5, 2009.
Office Action for U.S. Appl. No. 12/536,151, mailed Jan. 31, 2011.
U.S. Appl. No. 13/039,458, filed Mar. 3, 2011.
Office Action for U.S. Appl. No. 12/875,594, mailed Jan. 20, 2011.
Notice of Allowance for U.S. Appl. No. 12/536,124, mailed Jan. 18, 2011.
U.S. Appl. No. 12/985,932, filed Jan. 6, 2011.
U.S. Appl. No. 13/010,429, filed Jan. 20, 2011.
Office Action for U.S. Appl. No. 12/588,922, mailed Mar. 8, 2011.
Notice of Allowance for U.S. Appl. No. 12/536,151, mailed Mar. 25, 2011.
Office Action for U.S. Appl. No. 12/961,758, mailed Mar. 28, 2011.
Office Action for U.S. Appl. No. 13/010,429, mailed May 2, 2011.
Office Action issued on Jun. 6, 2011 in U.S. Appl. No. 13/039,458.
Notice of Allowance issued Jul. 13, 2011 in U.S. Appl. No. 12/875,594.

* cited by examiner

US 8,051,941 B2

PASSENGER'S WEIGHT MEASUREMENT DEVICE FOR VEHICLE SEAT

TECHNICAL FIELD

The present invention relates to a passenger's weight measurement device for a vehicle seat, which measures a weight of a passenger seated on the vehicle seat, and to an attachment structure for attaching a load sensor to the passenger's weight measurement device.

BACKGROUND ART

In recent years, in some cases, operations of various safety devices such as a seat belt and an air bag have been controlled in accordance with a weight of a passenger seated on a vehicle seat for the purpose of enhancing performance of the safety devices. In a conventional passenger's weight measurement device that measures the weight of the seated passenger, a load sensor is interposed between a vehicle floor and the vehicle seat (for example, refer to Patent Document 1 and Patent Document 2).
Patent Document 1: JP A H8-164039
Patent Document 2: JP A H9-207638

DISCLOSURE OF THE INVENTION

Problems to be Solved by the Invention

However, there is a dimension error or an assembling position error when the passenger's weight measurement device is assembled, when the vehicle seat is fixed to the passenger's weight measurement device or when the passenger's weight measurement device is fixed to the vehicle floor, or the like. Accordingly, it has been difficult to assemble the passenger's weight measurement device.

In this connection, it is an object of the present invention to provide a passenger's weight measurement device for a vehicle seat, which is more easily assembled.

Means for Solving the Problems

In order to solve the above-described problem, a passenger's weight measurement device for a vehicle seat according to the present invention comprises: an upper rail provided on a lower rail fixed to a vehicle floor so as to be movable in a rear and front direction; a load sensor fixed onto the upper rail; and a frame provided on the load sensor and below the vehicle seat, wherein a rod is extended from the load sensor, and the rod sequentially penetrates the frame, a plain washer and a spring holder, and is inserted into a coil spring, a bush is disposed along an edge of a hole of the plain washer, though which the rod is inserted, and a step difference is formed between an upper surface of the plain washer and the bush by protruding the bush from the upper surface, and a nut is screwed to the rod from above the spring holder, and the coil spring is sandwiched between the spring holder and the frame and is compressed and an end portion of the coil spring engages with the step difference by tightening the nut to the spring holder.

Effect of the Invention

In accordance with the present invention, the frame can be shifted in the vertical direction with respect to the load sensor. Accordingly, even if the lower rail, the upper rail, the frame and the like are distorted during the assembling or the like, an initial load generated by such distortions can be prevented from being applied to the load sensor.

Moreover, the coil spring is sandwiched between the frame and the spring holder in a state of being compressed by tightening the nut. Accordingly, the load sensor is fixed to the frame more stably and appropriately. Therefore, it becomes easier to assemble the passenger's weight measurement device.

Furthermore, the load is stably applied from the coil spring to the nut owing to elastic deformation of the coil spring, which is caused by tightening the nut.

Moreover, by tightening the nut, the end portion of the coil spring engages with the step difference formed between the upper surface of the washer and the bush. Accordingly, the coil spring is centered with respect to the washer without slipping on the upper surface of the washer.

BRIEF DESCRIPTION OF THE DRAWINGS

This is a perspective diagram of a Passenger's weight measurement device 1 for a vehicle seat.

BEST MODE FOR CARRYING OUT THE INVENTION

A best mode for carrying out the present invention will be described below by using the drawings. On embodiments to be described below, a variety of technically preferable limitations are imposed in order to carry out the present invention; however, the scope of the invention is not limited to the following embodiment and illustrated examples.

Figure 1:
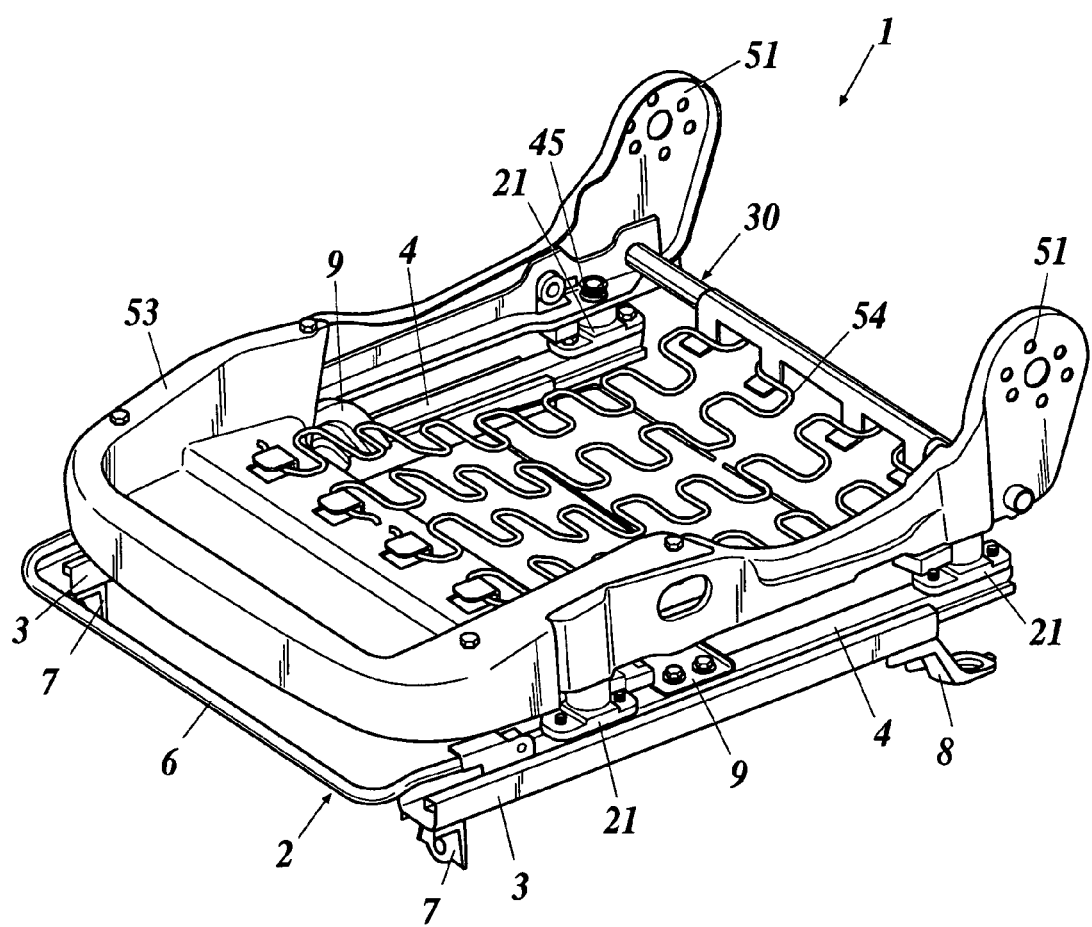
Figure 2:
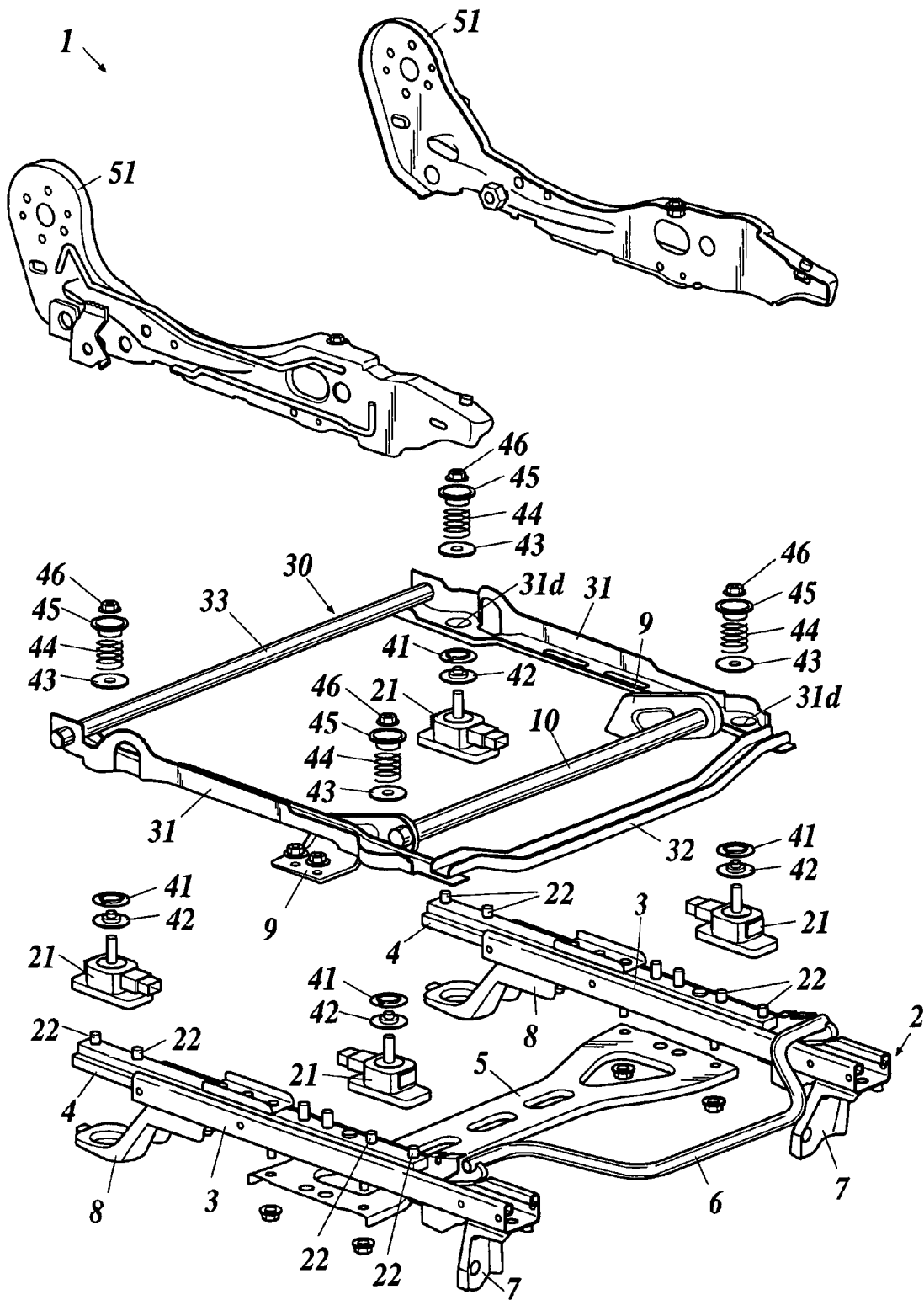
[FIG. 2] This is an exploded perspective diagram of the passenger's weight measurement device 1.

FIG. 1 is a perspective diagram of a Passenger's weight measurement device 1 for a vehicle seat, and FIG. 2 is an exploded perspective diagram of the passenger's weight measurement device 1.

As shown in FIG. 1 and FIG. 2, a slide adjuster 2 for adjusting a back-and-forth position of the vehicle seat is attached onto a floor of a passenger's room. The slide adjuster 2 includes a left and right pair of lower rails 3 provided in parallel to each other, a left and right pair of upper rails 4 engaged with the lower rails 3 so as to be capable of sliding on the respective lower rails 3 in a rear and front direction with respect to the lower rails 3, a lower bracket 5 fixed to lower surfaces of the lower rails 3 by bolt/nut coupling or rivet coupling and bridged between the left and right lower rails 3, a lock mechanism 6 for locking the upper rails 4 to the lower rails 3 and for releasing the locking, brackets 7 attached onto front end portions of the lower surfaces of the respective lower rails 3, and brackets 8 attached onto rear end portions of the lower surfaces of the respective lower rails 3. These brackets 7 and 8 are attached onto the vehicle floor, and the lower rails 3 are fixed to the vehicle floor.

Brackets 9 are fixed to middle positions of upper surfaces of the respective upper rails 4 in a rear and front direction by the bolt/nut coupling or the rivet coupling. The brackets 9 are provided in a state of being erected with respect to upper surfaces of the upper rails 4. A right end portion of a submarine pipe 10 is welded to the brackets 9, and the submarine pipe 10 is bridged between the two left and right brackets 9.

A load sensor 21 is mounted on a front end portion of the upper surface of the right upper rail 4, and another load sensor 21 is mounted on a rear end portion thereof. Also on the upper surface of the left upper rail 4, load sensors 21 are mounted on a front end portion and rear end portion thereof, respectively. When viewed from the above, these four load sensors 21 are arranged so as to be apexes of a square or a rectangle.

Figure 3:
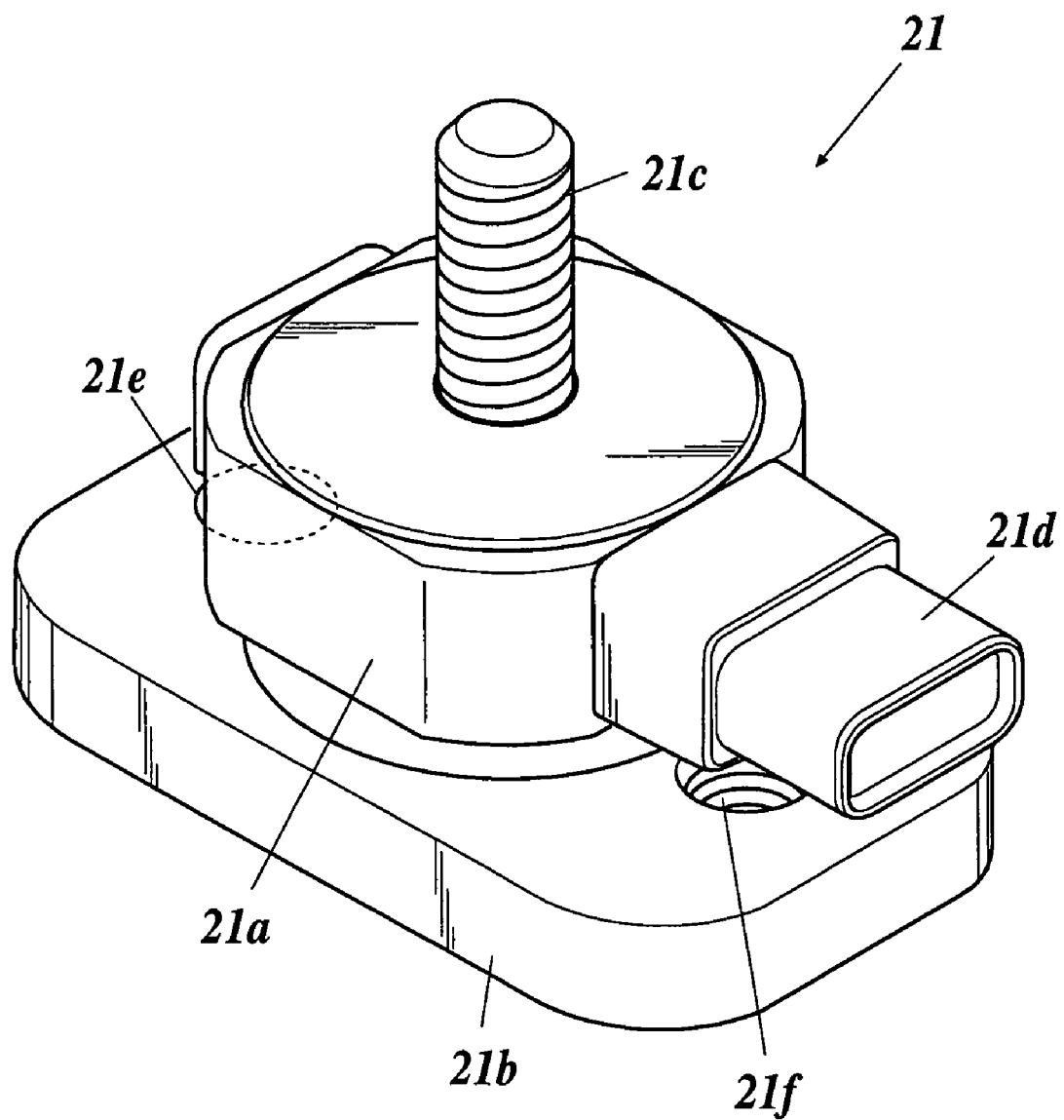
[FIG. 3] This is a perspective diagram of a load sensor 21.

FIG. 3 is a perspective diagram of the load sensor 21. All of the load sensors 21 are provided in a similar way. As shown in FIG. 3, the load sensor 21 includes a columnar sensing portion 21a that senses a load, a plate-like flange portion 21b extending horizontally in a rear and front direction from a lower end of the sensing portion 21a, a rod 21c extending upward from an upper end of the sensing portion 21a, and a connector 21d extending from the sensing portion 21a so as to be parallel to the flange portion 21b. The rod 21c is formed into a male screw shape. Female screw-shaped circular holes 21e and 21f which penetrate the flange portion 21b in the vertical direction are formed in front and rear portions of the flange portion 21b, respectively. The sensing portion 21a incorporates a strain gauge therein, and the load is converted into an electric signal by the strain gauge.

As shown in FIG. 2, the load sensor 21 is fixed to the right upper rail 4. Specifically, a lower surface of the flange portion 21b abuts on the upper surface of the upper rail 4, and two bolts 22 inserted through the upper rail 4 upward from below are screwed to the circular holes 21e and 21f, respectively. Therefore, the load sensor 21 is fixed. Note that the load sensor 21 may be fixed to the upper rail 4 by fastening nuts to the bolts 22 on the flange portion 21b without forming any screw threads in the circular holes 21e and 21f.

Any load sensor 21 is fixed to the upper rails 4 as described above. However, with regard to the two load sensors 21 fixed to the rear portions thereof, the connectors 21d are directed forward, and with regard to the two load sensors 21 fixed to the front portions thereof, the connectors 21d are directed backward.

Figure 4:
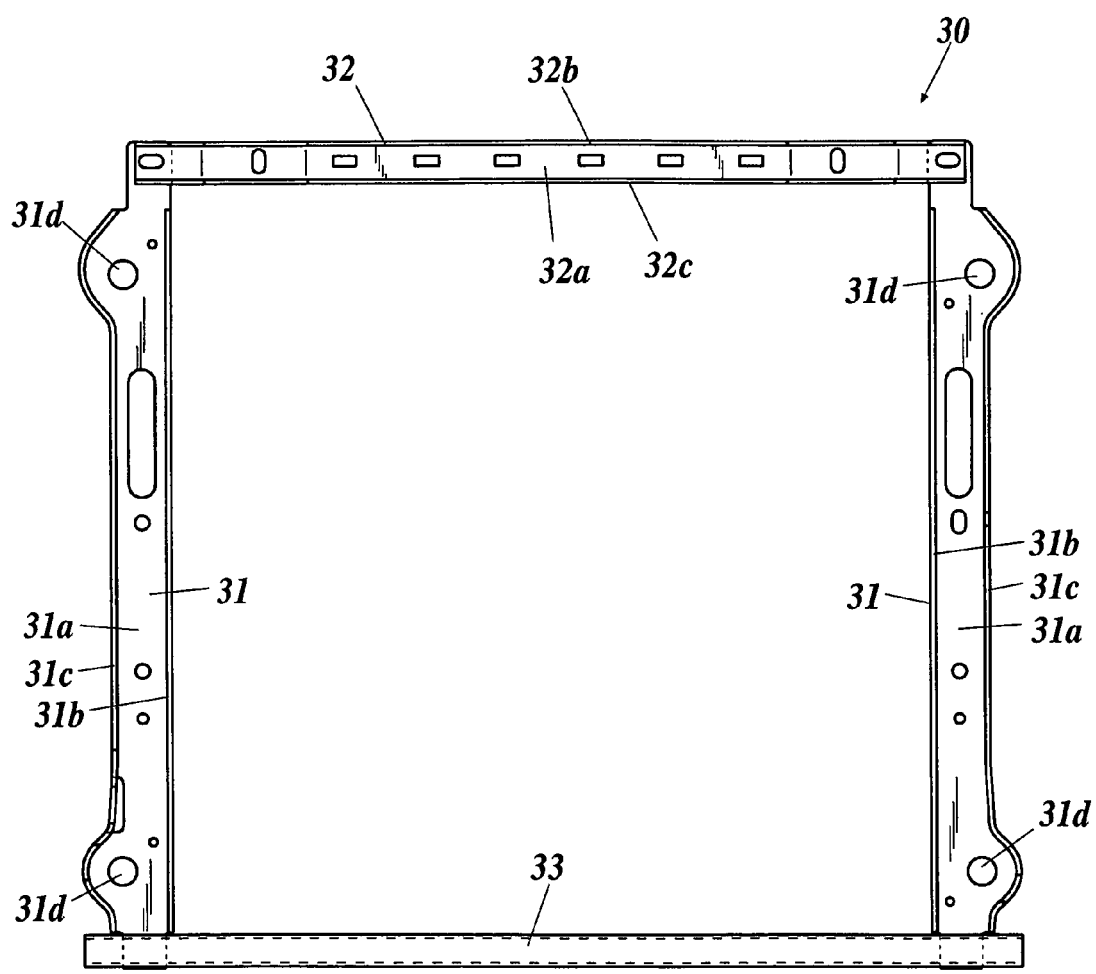
[FIG. 4] This is a plan diagram of a rectangular frame 30.

As shown in FIG. 1 and FIG. 2, the frame 30 having a rectangular frame shape is mounted on these four load sensors 21. FIG. 4 is a top diagram of the rectangular frame 30. As shown in FIG. 4, the rectangular frame 30 is composed of a left and right pair of beams 31, a front beam 32, and a rear cross pipe 33.

Either of the beams 31 is a metal member having a U-shaped cross section, and has a web 31a, an inner flange 31b, and an outer flange 31c. Attachment holes 31d are formed in a front portion and a rear portion of the web 31a, respectively.

The front beam 32 is a metal member having a U-shaped cross section, and has a web 32a, a front flange 32b, and a rear flange 32c. The front beam 32 is bridged between front end portions of the left and right beams 31, and is welded to these beams 31.

The cross pipe 33 is bridged between rear end portions of the left and right beams 31, and is welded to these beams 31.

Figure 5:
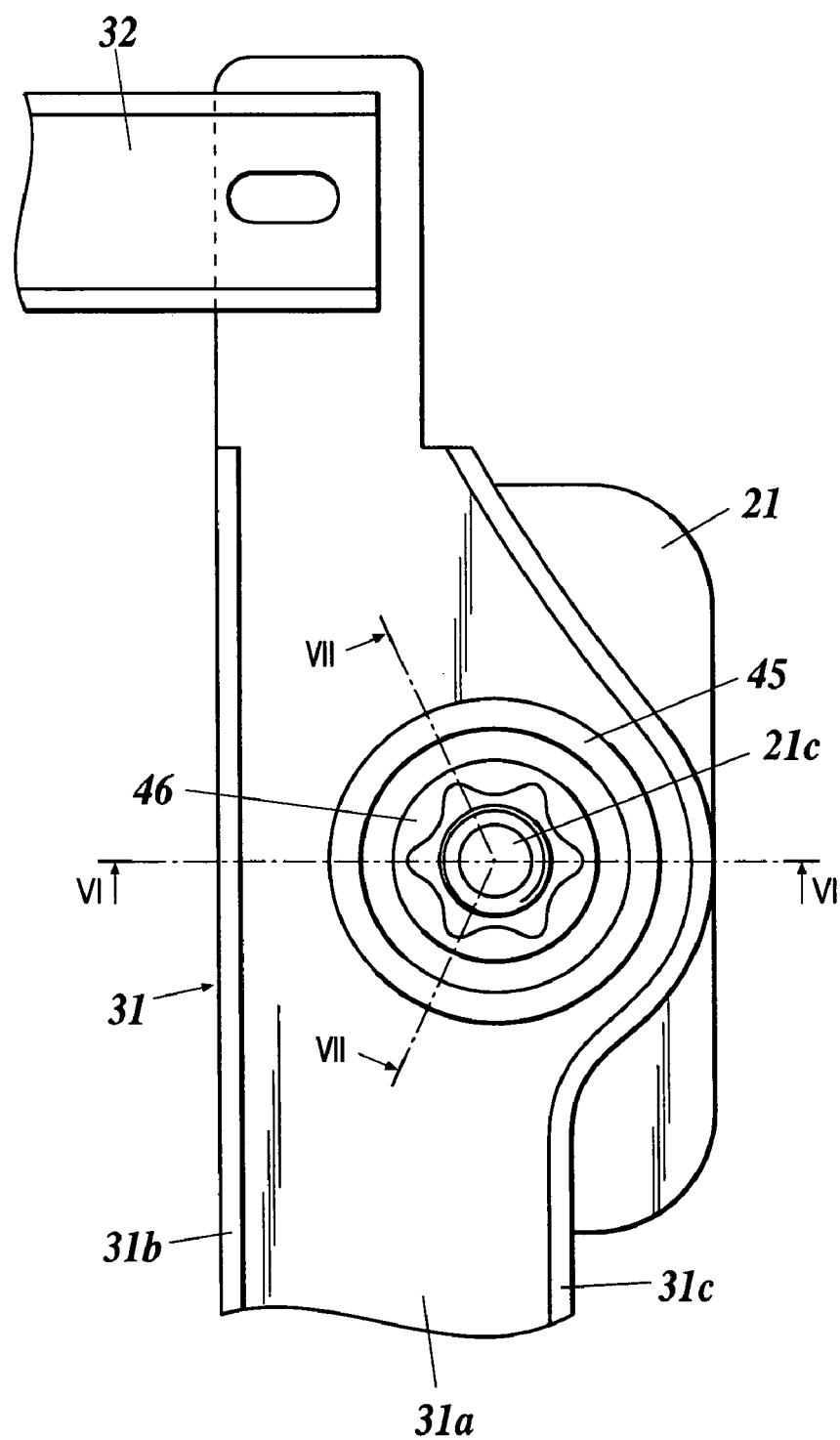
[FIG. 5] This is a plan diagram of a right front portion of the rectangular frame 30.
Figure 6:
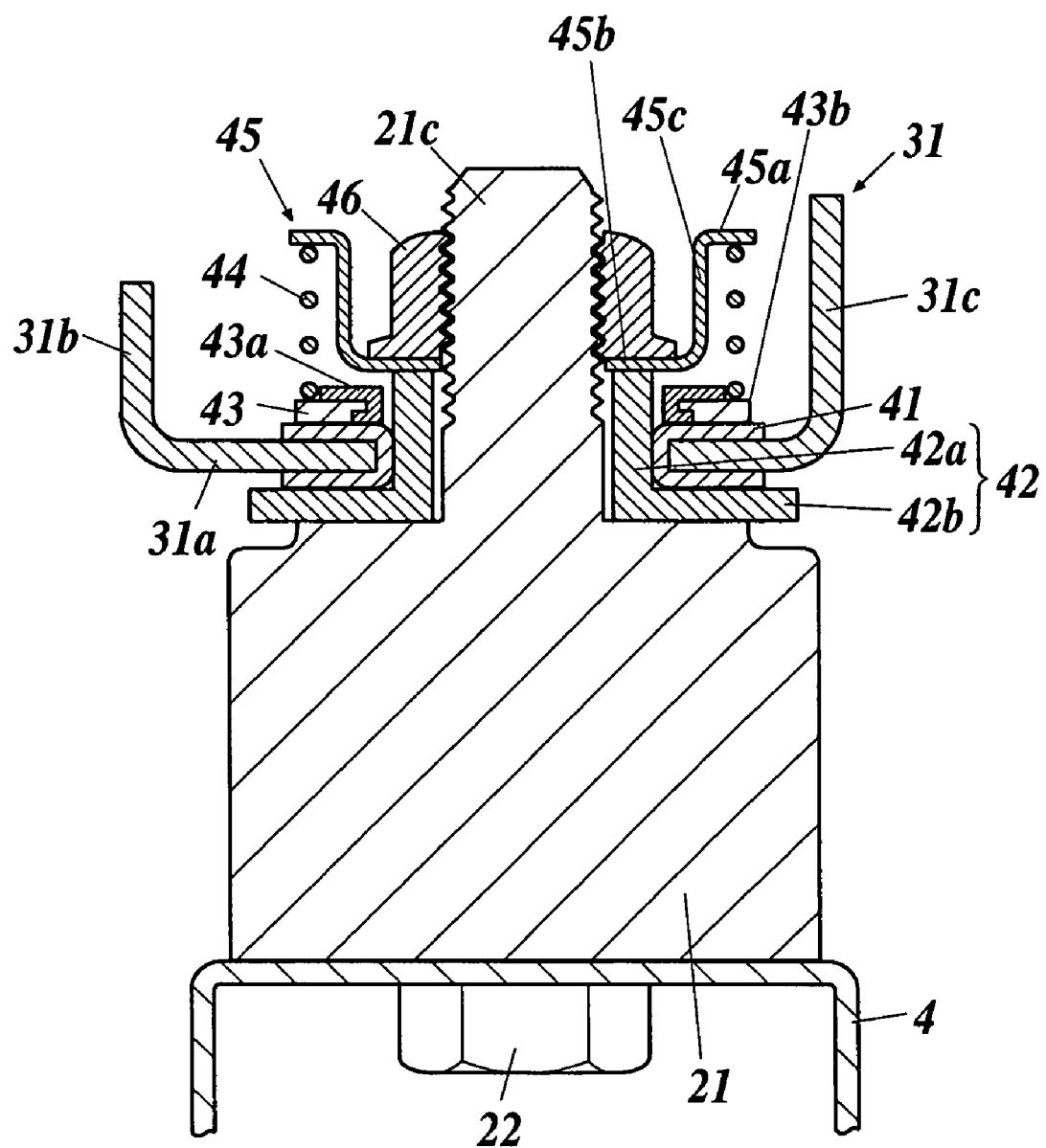
[FIG. 6] This is a cross-sectional diagram showing a cross section along a line VI-VI of FIG. 5.
Figure 7:
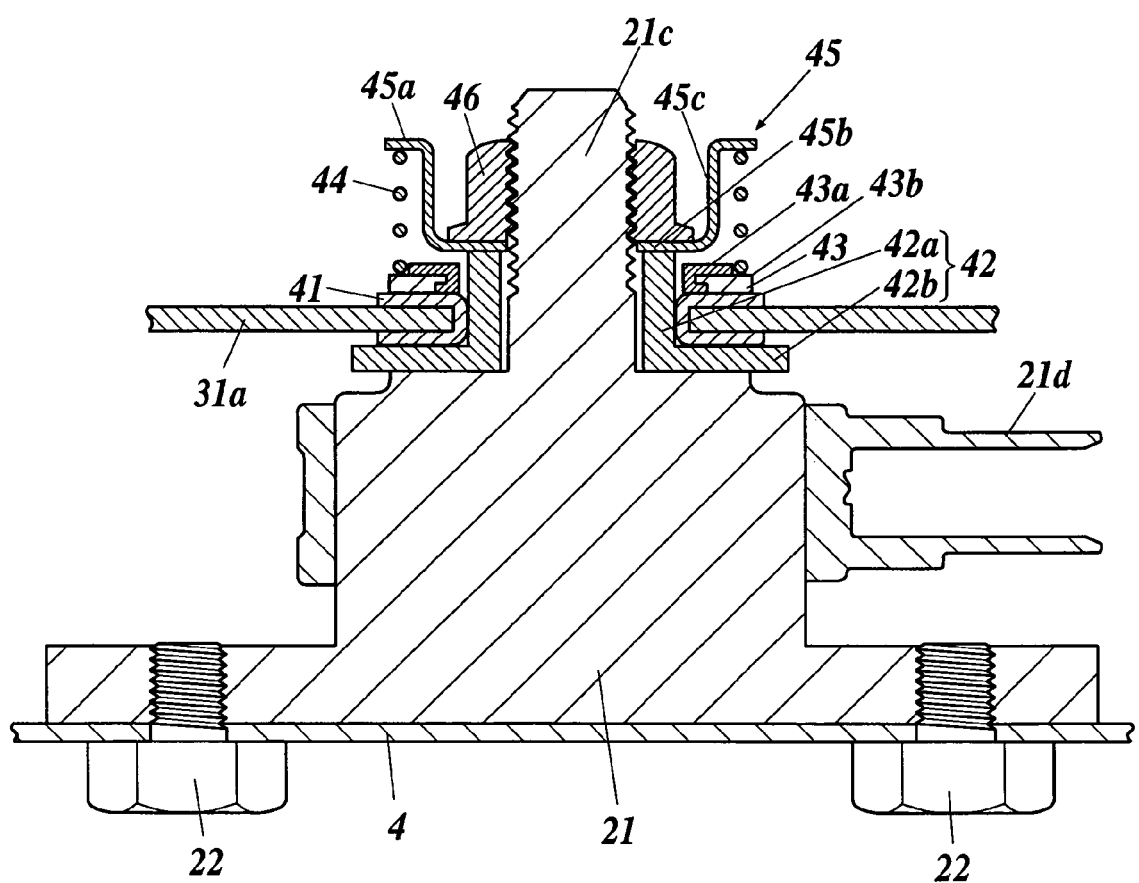
[FIG. 7] This is a cross-sectional diagram showing a cross section along a line VII-VII of FIG. 5.

The rods 21c of the load sensors 21 are inserted into the respective attachment holes 21d upward from below, and nuts 46 are screwed to the rods 21c. Therefore, the load sensors 21 are attached onto a right front portion, a right rear portion, a left front portion and a left rear portion of the rectangular frame 30, respectively. Referring to FIG. 5 to FIG. 7, an attachment structure for attaching the right front load sensor 21 onto the right front portion of the rectangular frame 30 will be described. FIG. 5 is a plan diagram of the right front portion of the rectangular frame 30, FIG. 6 is a cross-sectional diagram showing a cross section along a line VI-VI, and FIG. 7 is a cross-sectional diagram showing a cross section along a line VII-VII. As shown in FIG. 5 to FIG. 7, an annular bush 41 is fitted to an edge of the right front attachment hole 31d, and grease is applied on the bush 41. The bush 41 is made of synthetic resin. Moreover, a stepped collar 42 composed of a cylindrical portion 42a and an annular plate-like flange portion 42b formed on one end surface of the cylindrical portion 42a is inserted through the attachment hole 31d in an inside of the bush 41. Here, the cylindrical portion 42a is inserted through the attachment hole 31d upward from below, and the flange portion 42b engages with a lower surface of the web 31a via the bush 41. Therefore, the stepped collar 42 is not pulled out upward. Moreover, the cylindrical portion 42a protrudes from an upper surface of the web 31a, and an upper end surface of the cylindrical portion 42a is located at a higher position than the upper surface of the web 31a. Here, the cylindrical portion 42a is fitted to the bush 41, and there is no gap between the cylindrical portion 42a and the bush 41.

The rod 21c of the load sensor 21 is inserted through the stepped collar 42 upward from below. An inner diameter of the stepped collar 42 is designed to be slightly larger than a diameter of the rod 21c, and by such designing, a dimension error and an attachment position error are solved.

The nut 46 is screwed to the rod 21c. A plain washer 43, a coil spring 44 and a spring holder 45 are interposed between the upper surface of the web 31a of the beam 31 and the nut 46. An annular bush 43a is disposed along an edge of a hole of the plain washer 43, and the edge of the hole of the plain washer 43 is sandwiched vertically by this bush. Therefore, the bush 43a is fitted to the edge of the hole of the plain washer 43. In such a way, the bush 43a and the plain washer 43 are integrated with each other. Moreover, the bush 43a protrudes from an upper surface of the plain washer 43. Therefore, a step difference 43b is formed on the upper surface of the plain washer 43 by the bush 43a. Moreover, a lower surface of the plain washer 43 and a lower surface of the bush 43a become flush with each other. Furthermore, the rod 21c is inserted through the coil spring 44, the coil spring 44 is set in a state of being mounted on the plain washer 43 on a circumference of the bush 43a, and an end portion of the coil spring 44 engages with the step difference 43b formed by the bush 43a. Therefore, the coil spring 44 is centered with respect to the plain washer 43. A portion of the coil spring 44, which is brought into contact with the plain washer 43, is formed to be flat. The bush 43a is made of synthetic resin, and a tapping sound is prevented by the bush 43a.

The spring holder 45 includes a cup portion 45c in which a through hole is formed in a bottom 45b, and an annular flange 45a formed on an outer circumferential surface in an opening of the cup portion 45c. Then, the rod 21c penetrates through the through hole of the bottom 45b of the cup portion 45c, the bottom 45b of the cup portion 45c is set in a state of being mounted on an end surface of the stepped collar 42, and the cup portion 45c is inserted into the coil spring 44. Moreover, the coil spring 44 and the plain washer 43 are set in a state of being sandwiched between the flange 45a of the spring holder 45 and the web 31a.

The nut 46 is screwed to the rod 21c in a state of being inserted into the cup portion 45c, and by tightening the nut 46, the bottom 45b of the cup portion 45c is sandwiched between the nut 46 and the upper end surface of the cylindrical portion 42a, and the coil spring 44 and the plain washer 43 are sandwiched between the flange 45a and the web 31a of the beam 31. Moreover, since the coil spring 44 is compressed by tightening the nut 46, the load is applied to the nut 46, and accordingly, the nut 46 is prevented from being loosened.

Like the right front load sensor 21, the left front, left rear and right rear load sensors 21 are attached onto the left front, left rear and right rear attachment holes 31d, respectively. In a state where the four load sensors 21 are attached onto the rectangular frame 30, the submarine pipe 10 is located behind the front beam 32.

As shown in FIG. 1 and FIG. 2, side frames 51 are welded to the outer flanges 31c of the left and right beams 31, respectively. These side frames 51 are parts of a bottom frame of the vehicle seat.

From above, front portions of the side frames 51 are covered with a pan frame 53, and the side frames 51 and the pan frame 53 are fixed to each other by the bolt/nut coupling or the rivet coupling. A seat spring 54 is bridged between the cross pipe 33 and the pan frame 53, a cushion is mounted on the pan frame 53 and the seat spring 54, and the cushion, the pan frame 53 and the side frames 51 are entirely covered with a cover.

A backrest frame is coupled to rear ends of the side frames 51, and is capable of rising and falling by a reclining mechanism. Note that the backrest frame and the cushion are not shown in order to make it easy to view the drawings.

In the passenger's weight measurement device 1 configured as described above, when a passenger is seated on a seat bottom, a weight of the passenger is applied to the four load sensors 21 through the rectangular frame 30, and is converted into electric signals by these load sensors 21.

Here, the load sensors 21 are attached between the upper rails 4 and the rectangular frame 30, and the load sensors 21 move in a rear and front direction integrally with the vehicle seat. Accordingly, a load inputted from the vehicle seat to the load sensors 21 can be always kept constant irrespective of position of the vehicle seat in a rear and front direction. Therefore, measuring accuracy of the passenger's weight can be enhanced.

Moreover, the spring holder 45 is mounted on the upper end surface of the stepped collar 42, and the coil spring 44 is sandwiched between the spring holder 45 and the web 31a by tightening the nut 46. Accordingly, the rectangular frame 30 can be shifted in the vertical direction with respect to the load sensors 21. Therefore, noise of the load generated by distortion of the slide adjuster 2 and the like becomes smaller.

Moreover, even if the rectangular frame 30 can be shifted in the vertical direction with respect to the load sensors 21, the coil springs 44 are interposed between the nuts 46 and the webs 31a, and accordingly, the load sensors 21 can be fixed to the rectangular frame 30 more stably and appropriately. Therefore, it becomes easier to assemble the passenger's weight measurement device 1.

Moreover, the load is stably applied from each of the coil springs 44 to each of the nuts 46 owing to elastic deformation of the coil spring 44, which is caused by tightening the nut 46.

Moreover, the submarine pipe 10 is located behind the front beam 32, and accordingly, when forward inertial force is applied to the passenger owing to a frontal collision or the like of the vehicle, buttocks of the passenger seated on the vehicle seat are restrained by the submarine pipe 10. Therefore, a so-called submarine phenomenon in which the passenger moves under a waist belt can be prevented.

Note that the present invention is not limited to the above-described embodiment, and various improvements and design changes can be made within the scope without departing from the gist of the present invention.

INDUSTRIAL APPLICABILITY

As described above, the present invention can be widely used, for example, for seats of an automobile, an electric train and other vehicles.

The invention claimed is:

1. A vehicle seat, comprising:
right and left upper rails, provided on corresponding right and left lower rails that are fixable to a vehicle floor, so as to be movable in a rear-and-front direction;
at least one load sensor being attached above one of the right and left upper rails; and
a frame member for the vehicle seat, the frame member being provided above the load sensors,
wherein for the at least one load sensor:
a rod is extended from the load sensor, and the rod penetrates the frame member and a holder for an elastic member, and is inserted into the elastic member,
the elastic member is provided between the holder for the elastic member and the frame member,
the holder for the elastic member comprises a position regulating portion capable of regulating a radial position of the elastic member,
the load sensor comprises a connector extending therefrom, and provided below a load sensor attachment portion of the frame member,
at least a part of the connector is provided at a position apart from a shaft center of the rod of the load sensor,
the elastic member, the holder for the elastic member and the frame member are disposed in a line parallel with the shaft line of the rod of the load sensor, and
wherein, in a space for disposing the elastic member between the frame member and the holder for the elastic member, a space enlarged portion that is enlarged in the direction of the shaft line of the rod of the load sensor is formed, and at least a past of the elastic member is disposed in the space enlarged portion.

2. The vehicle seat as claimed in claim 1, wherein the at least one load sensor is attached above a front portion of the one of the right and left upper rails, and wherein the connector extends rearwardly from the load sensor that is attached above the front portion of the one of the right and left upper rails, and
a rear end portion of the connector is provided at the position farther apart from the shaft center of the rod than the outer peripheral part of the corresponding load sensor attachment portion of the frame member.

3. The vehicle seat as claimed in claim 1, wherein the at least one load sensor is attached above a rear portion of one of the right and left upper rails, and wherein the connector extends frontwardly from the load sensor that is provided on the rear portion of the one of the right and left upper rails, and
a front end portion of the connector is provided at the position farther apart from the shaft center of the rod than the outer peripheral part of the corresponding load sensor attachment portion of the frame member.

4. The vehicle seat as claimed in claim 1, wherein the at least one load sensor is attached on a front portion of one of the right and left upper rails, and wherein the load sensor provided on the front portion of the one of the right and left upper rails comprises a front portion connector that extends rearwardly from such load sensor, and
wherein an additional load sensor is attached on a rear portion of the one of the right and left upper rails, and wherein the additional load sensor provided on the rear portion of the one of the right and left upper rails comprises a rear portion connector extending frontwardly from such load sensor.

5. The vehicle seat as claimed in claim 1, wherein a plate member that is a separate member from the one of the right and left upper rails is provided to fix the at least one load sensor above the one of the right and left upper rails.

6. The vehicle seat as claimed in claim 5, wherein a plurality of holes are formed in the plate member for fixing the plate member to the one of the right and left upper rails, and
the plurality of holes are arranged in the rear-and-front direction on the one of the right and left upper rails.

7. The vehicle seat as claimed in claim 5, wherein the at least one load sensor is directly attached to the plate member.

8. The vehicle seat as claimed in claim 1, wherein the load sensor attachment portion is provided on a front portion of the frame member, and the vehicle seat further comprises a connecting member for connecting between a front side of the frame member and a front side of another frame member and,
wherein the connecting member is provided at a position that is different from a position of the connector in a vertical direction.

9. The vehicle seat as claimed in claim 8, wherein at least one end portion of the connecting member is narrower in the rear-and-front direction than the load sensor attachment portion, the one end portion that is narrower being connected with the frame member and being provided at a higher position than a surface to which the load sensor is attached.

10. The vehicle seat as claimed in claim 2, wherein the load sensor attachment portion is provided on a front portion of the frame member, and the vehicle seat further comprises a connecting member for connecting between a front side of the frame member and a front side of another frame member,
wherein at least a part of the connecting member is provided in front of the rear end portion of the connector.

11. The vehicle seat as claimed in claim 10, wherein at least one end portion of the connecting member is narrower in the rear-and-front direction than the load sensor attachment portion, the one end portion that is narrower being connected with the frame member and being provided above the connector.

12. The vehicle seat as claimed in claim 3, wherein a load sensor attachment portion is provided on a rear portion of the frame member, and the vehicle seat further comprises a connecting member for connecting between a rear side of the frame member and a rear side of another frame member,
wherein the connecting member is provided behind the front end portion of the connector.

13. The vehicle seat as claimed in claim 1, wherein the load sensor attachment portion of the frame member comprises a projecting wall projecting upwardly, and
the projecting wall is provided so as to face to the holder for the elastic member.

14. The vehicle seat as claimed in claim 1, wherein the load sensor attachment portion of the frame member comprises a projecting wall projecting upwardly, and
the connector is disposed below the projecting wall.

15. The vehicle seat as claimed in claim 1, wherein the load sensor attachment portion of the frame member comprises a projecting wall projecting upwardly,
wherein the part of the connector that is provided at a position apart from the shaft center of the rod of the load sensor is an end portion of the connector,
the connector is disposed below the projecting wall, and
the end portion of the connector extends in a rear direction or in a front direction more than the projecting wall.

16. The vehicle seat as claimed in claim 1, wherein a rear portion part of a front load sensor attachment portion of the frame member comprises the projecting wall projecting upwardly, the front load sensor attachment portion being provided at a front portion of the frame member,
wherein the end portion of the connector that is provided at a position apart from the shaft center of the rod of the load sensor is a rear end portion of the connector, and
the rear end portion of the connector extends in a rear direction more than the projecting wall.

17. The vehicle seat as claimed in claim 1, wherein a front portion part of a rear load sensor attachment portion of the frame member comprises the projecting wall projecting upwardly, the rear load sensor attachment portion being provided at a rear portion of the frame member,
wherein the end portion of the connector is a front end portion of the connector, and
the front end portion of the connector extends in a front direction more than the projecting wall.

18. The vehicle seat as claimed in claim 1,
wherein a front load sensor attachment portion is provided on a front side of the frame member and a connecting member is provided so as to connect between a front portion of the frame member having the front load sensor attachment portion and another frame member.

19. The vehicle seat as claimed in claim 1, wherein at least one end of a connecting member for connecting the frame member to another frame member is provided on a position that is shifted from the rod of the load sensor in the rear-and-front direction.

20. The vehicle seat as claimed in claim 1, wherein a rear load sensor attachment portion is provided on a rear side of the frame member, a connecting member is provided so as to connect between a rear portion of the frame member having the rear load sensor attachment portion and another frame member, and an end portion of the connector is forwardly extended toward a position in which the connecting member does not exist, the rear portion of the frame member being rearward of the rear load sensor attachment portion.

21. The vehicle seat as claimed in claim 1, wherein an upward projecting wall projecting upwardly is provided on the load sensor attachment portion of the frame member so as to face the rod of the load sensor.

22. The vehicle seat as claimed in claim 1, wherein a projecting wall projecting in a vertical direction parallel to the shaft of the rod is provided on the load sensor attachment portion of the frame member and the projecting wall is disposed across the load sensor attachment portion from the connector.

23. The vehicle seat as claimed in claim 1, wherein an upward projecting wall projecting upwardly is provided on the load sensor attachment portion of the frame member, the connector is disposed below the projecting wall and the projecting wall is disposed across the load sensor attachment portion from the connector.

24. The vehicle seat as claimed in claim 1, wherein the position regulating portion is provided unitedly with the holder between the rod of the load sensor and the elastic member.

25. The vehicle seat as claimed in claim 1, wherein at least a part of the load sensor is provided at a position farther from the shaft center of the rod than an outer peripheral part of each of the load sensor attachment portion of the frame member.

26. The vehicle seat as claimed in claim 1, wherein:
the holder for the elastic member includes a first surface and a second surface being located at different levels in the direction of the shaft line of the rod,
an area between the first surface and the second surface of the holder for the elastic member forms the space enlarged portion, and at least a part of the elastic member is disposed in the space enlarged portion.

27. The vehicle seat as claimed in claim 26, wherein at least a part of the area between the first surface and the second surface regulates a radial position of the elastic member.

* * * * *